United States Patent [19]
Narvey

[11] Patent Number: 5,263,578
[45] Date of Patent: Nov. 23, 1993

[54] COUPON HOLDER CONTAINER

[76] Inventor: Diane M. Narvey, 1027 W. Long Ave., DuBois, Pa. 15801

[21] Appl. No.: 933,766

[22] Filed: Aug. 24, 1992

[51] Int. Cl.$^5$ .......................... B65D 69/00; B60R 7/00
[52] U.S. Cl. ............................ 206/232; 211/10; 211/55; 211/69.1; 220/505; 224/42.46 R; 224/277; 280/33.992
[58] Field of Search ........... 224/277, 42.46, 252, 224/256; 280/33.992; 211/10, 11, 55, 69.1; 206/232, 38; 220/505, 500; D3/74; D6/553, 555

[56] References Cited

U.S. PATENT DOCUMENTS

| | | | |
|---|---|---|---|
| D. 301,101 | 5/1989 | Meyer | D6/553 X |
| D. 334,676 | 4/1993 | Liptak | D6/553 X |
| 1,560,493 | 11/1925 | Steinberg | 211/69.1 X |
| 3,539,204 | 11/1970 | Keller | 280/33.992 X |
| 3,820,656 | 6/1974 | Orr | 220/505 X |
| 3,909,092 | 9/1975 | Kiernan | 220/505 X |
| 4,274,567 | 6/1981 | Sawyer | 224/277 X |
| 4,460,095 | 7/1984 | Kessler et al. | 211/69.1 |
| 4,510,872 | 4/1985 | Parry | 211/50 X |
| 4,938,402 | 7/1990 | Anatra et al. | 224/277 |
| 4,966,318 | 10/1990 | Dutka | 224/42.46 R |
| 5,048,736 | 9/1991 | Anatra | 224/277 |
| 5,086,960 | 2/1992 | Schwietzer | 224/277 |

Primary Examiner—Bryon P. Gehman
Attorney, Agent, or Firm—Leon Gilden

[57] ABSTRACT

A coupon holder container includes a forward container cavity spaced in adjacency to and below a rear container cavity, with the rear container cavity of a rear container including a rear wall mounting a spring clip to an upper end of the rear wall for securement to a handle portion of a shopping cart. The forward container cavity of a forward container includes a forward wall mounting a plurality of U-shaped supports for selectively receiving a pencil or alternatively, a calculator support plate having a support flange projecting forwardly of and below the forward container.

3 Claims, 4 Drawing Sheets

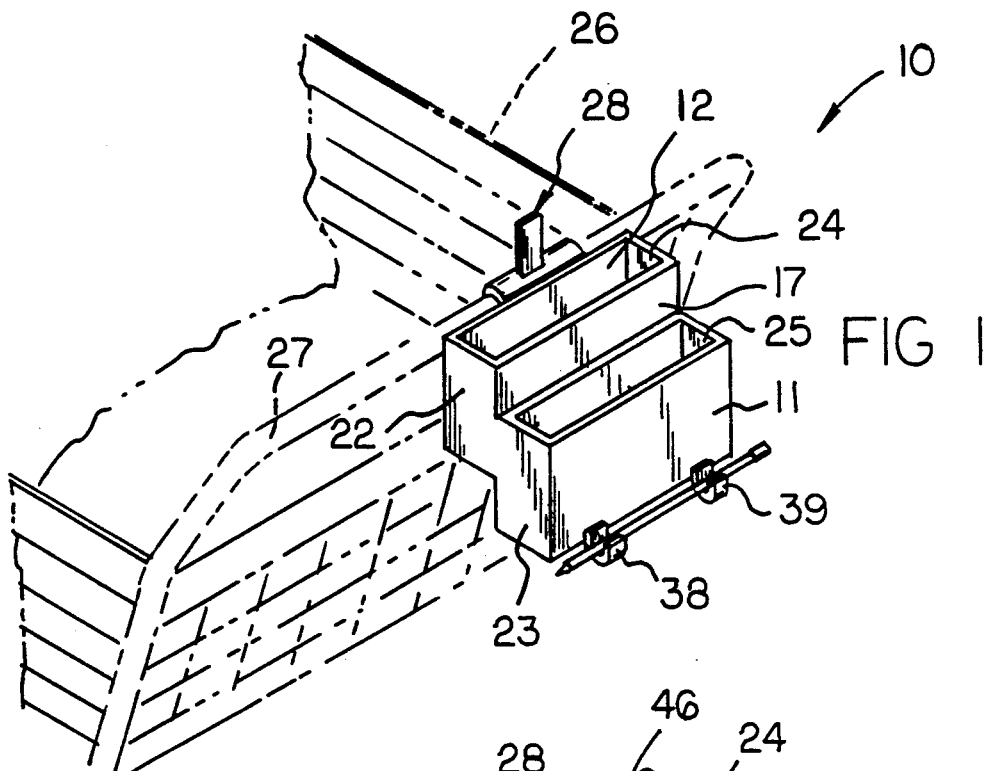
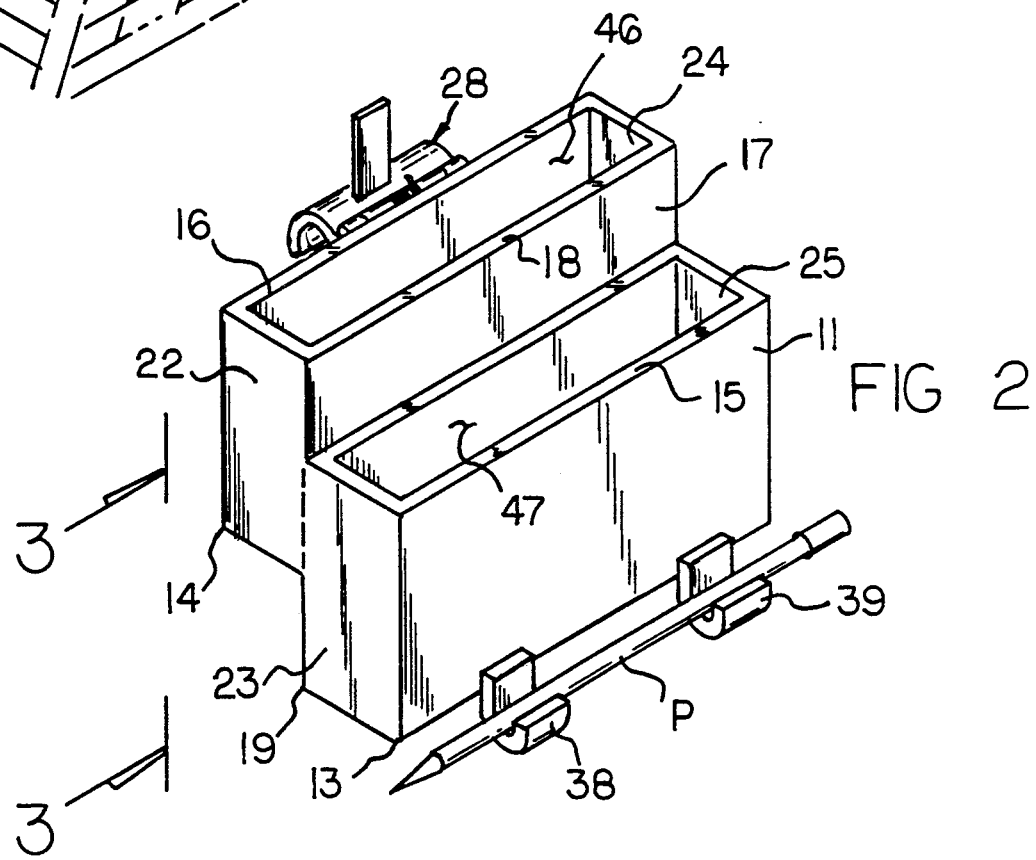

COUPON HOLDER CONTAINER

BACKGROUND OF THE INVENTION

1. Field of the Invention

The field of invention relates to coupon holder structure, and more particularly pertains to a new and improved coupon holder container wherein the same is arranged for ease of mounting and securement to an associated shopping cart for positioning coupons for access and retrieval.

2. Description of the Prior Art

Coupon holders of various types have been utilized in the prior art and exemplified in U.S. Pat. No. 3,911,605 to Morhack wherein a coupon holder includes a plurality of spring clips mounted to a binding enclosure for ease of access.

Further examples of book-like coupon holder structure are exemplified in the U.S. Pat. Nos. 4,795,195 to McClain, Jr. and 4,004,690 to Giarritta.

The instant invention attempts to overcome deficiencies of the prior art by providing for a rigid unitary container structure mounting a plurality of containers for ease of access to retrieval of coupons for securement to a shopping cart and in this respect, the present invention substantially fulfills this need.

SUMMARY OF THE INVENTION

In view of the foregoing disadvantages inherent in the known types of coupon holder structure now present in the prior art, the present invention provides a coupon holder container wherein the same utilizes a plurality of spaced rigid container members integrally mounted together for securement to an associated shopping cart handle. As such, the general purpose of the present invention, which will be described subsequently in greater detail, is to provide a new and improved coupon holder container which has all the advantages of the prior art coupon holder structure and none of the disadvantages.

To attain this, the present invention provides a coupon holder container including a forward container cavity spaced in adjacency to and below a rear container cavity, with the rear container cavity of a rear container including a rear wall mounting a spring clip to an upper end of the rear wall for securement to a handle portion of a shopping cart. The forward container cavity of a forward container includes a forward wall mounting a plurality of U-shaped supports for selectively receiving a pencil or alternatively, a calculator support plate having a support flange projecting forwardly of and below the forward container.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved coupon holder container which has all the advantages of the prior art coupon holder structure and none of the disadvantages.

It is another object of the present invention to provide a new and improved coupon holder container which may be easily and efficiently manufactured and marketed.

It is a further object of the present invention to provide a new and improved coupon holder container which is of a durable and reliable construction.

An even further object of the present invention is to provide a new and improved coupon holder container which is susceptible of a low cost of manufacture with regard to both materials and labor, and which accordingly is then susceptible of low prices of sale to the consuming public, thereby making such coupon holder containers economically available to the buying public.

Still yet another object of the present invention is to provide a new and improved coupon holder container which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the invention in use.

FIG. 2 is an enlarged isometric illustration of the invention.

DESCRIPTION OF THE PREFERRED EMBODIMENT

Figure 3:
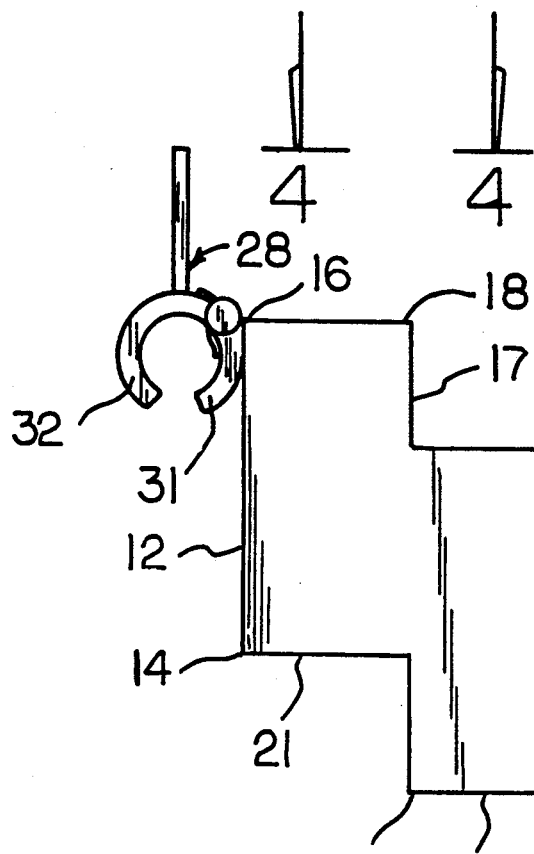
FIG. 3 is an orthographic view, taken along the lines 3—3 of FIG. 2 in the direction indicated by the arrows.
Figure 4:
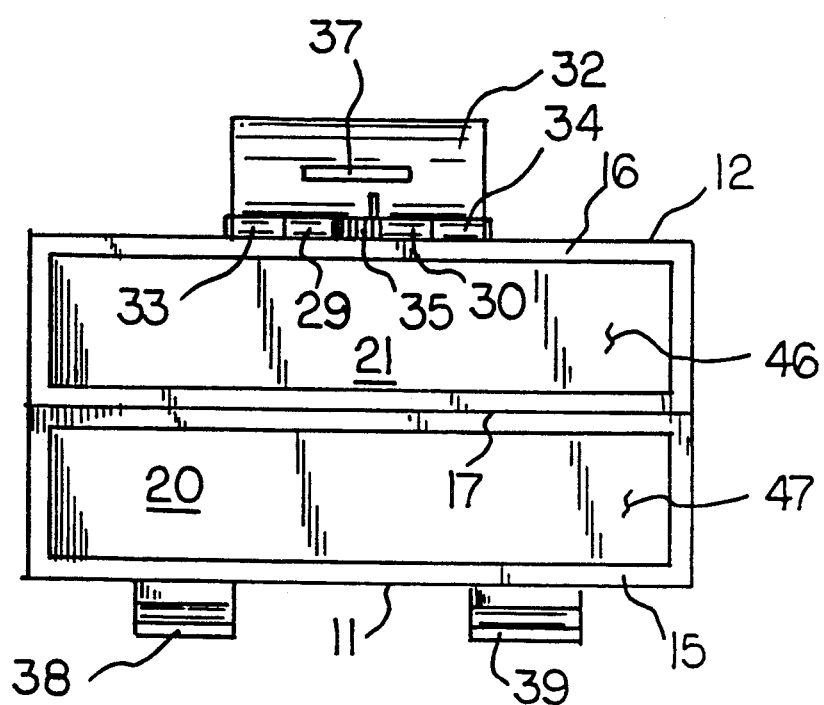
FIG. 4 is an orthographic view, taken along the lines 4—4 of FIG. 3 in the direction indicated by the arrows.
Figure 5:
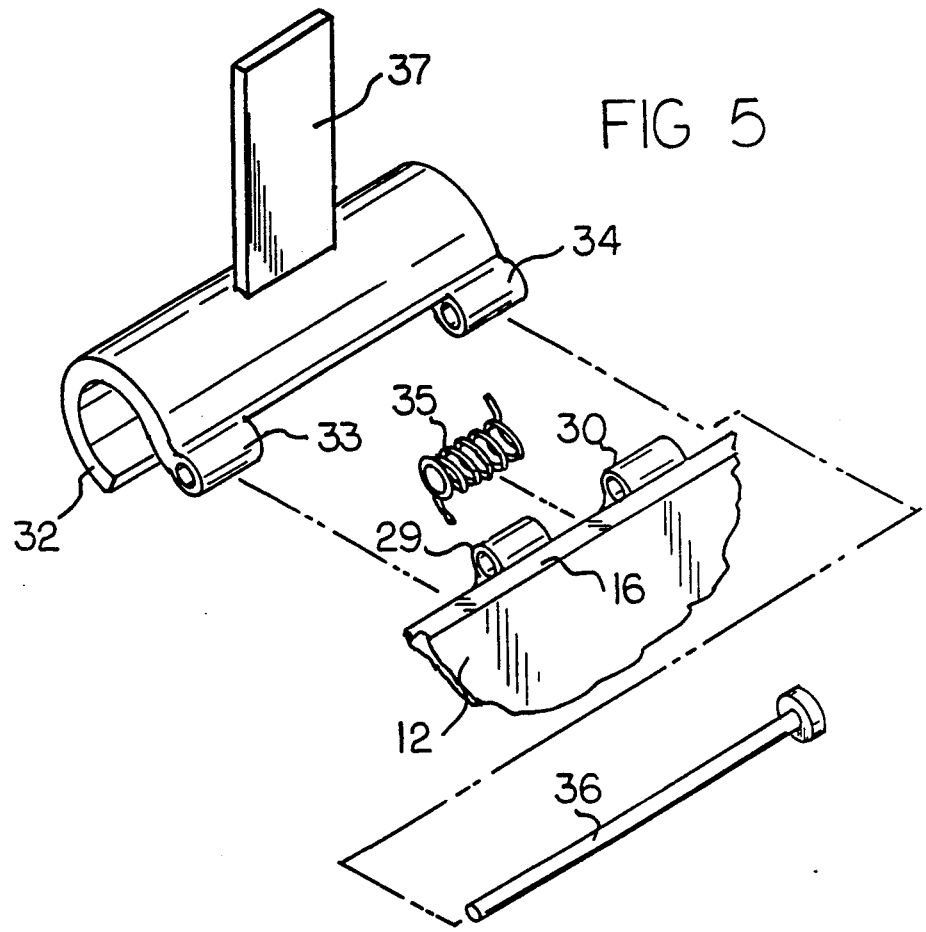
FIG. 5 is an isometric exploded illustration of the spring clip structure of the invention.
Figure 6:
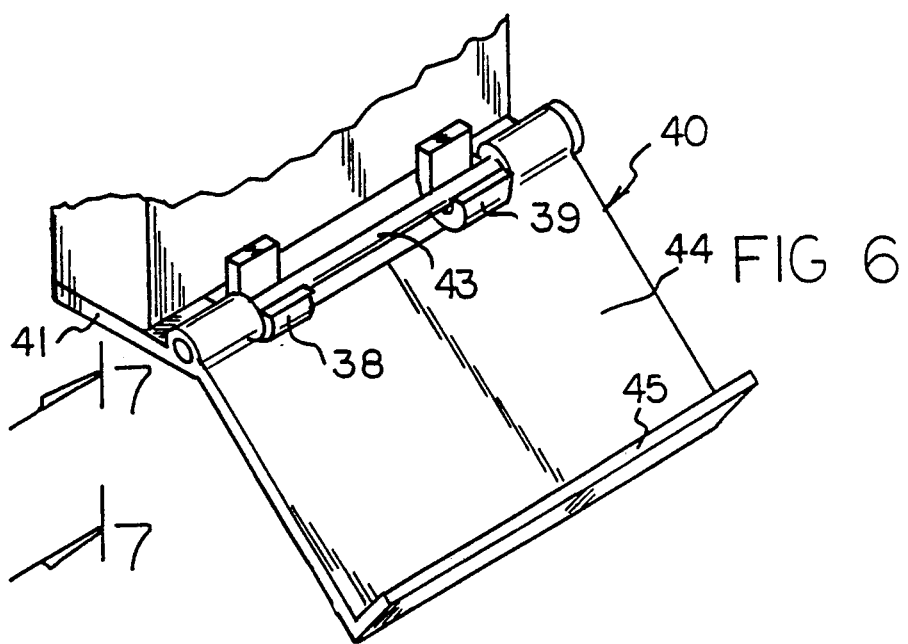
FIG. 6 is an isometric illustration of the calculator support rack utilized by the invention.
Figure 7:
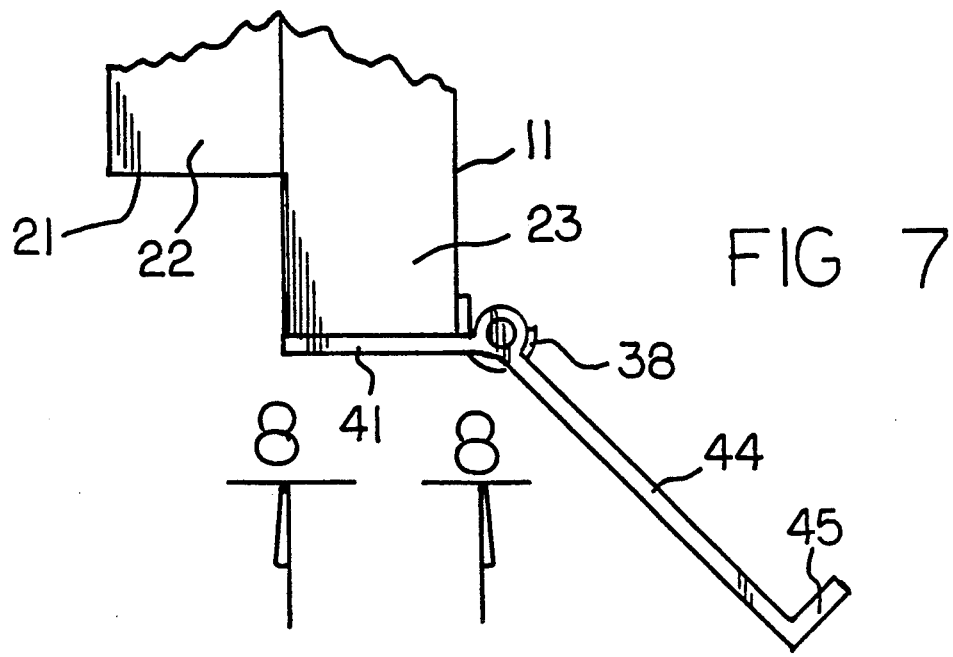
FIG. 7 is an orthographic view, taken along the lines 7—7 of FIG. 6 in the direction indicated by the arrows.
Figure 8:
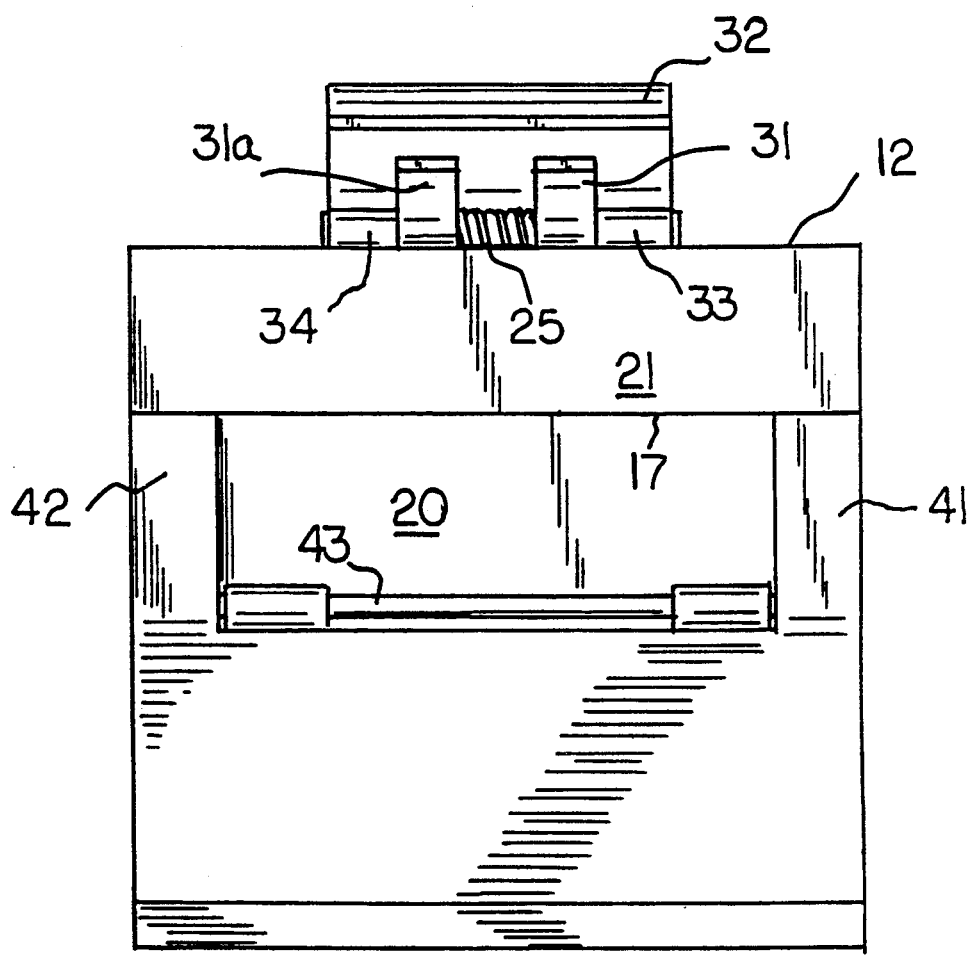
FIG. 8 is an orthographic view, taken along the lines 8—8 of FIG. 7 in the direction indicated by the arrows.

With reference now to the drawings, and in particular to FIGS. 1 to 8 thereof, a new and improved coupon holder container embodying the principles and concepts of the present invention and generally designated by the reference numeral 10 will be described.

More specifically, the coupon holder container 10 of the instant invention essentially comprises a rear container integrally mounted to a forward container, with the rear container including a rear container cavity 46 in adjacency to a forward container cavity 47 to receive various coupons for their ease of positioning and retrieval by a user of the organization.

A planar front wall 11 is arranged in a parallel spaced relationship relative to a planar rear wall 12 of the container structure 10. The front wall includes a front wall lower end 13 parallel to and below a rear wall lower end 14. A front wall upper end 15 is oriented parallel to and above the front wall lower ends 13 and 14 and below a rear wall upper end 16 in a parallel relationship. An intermediate wall 17 is oriented parallel to and positioned medially of the front and rear walls 11 and 12 in a coextensive relationship relative to the rear wall 12. The intermediate wall 17 includes an intermediate wall upper end 18 arranged in a parallel coplanar relationship relative to the rear wall upper end 16. The intermediate wall lower end 19 is provided in a coplanar relationship with the front wall lower end 13. A first floor 20 is directed between the front wall lower end 13 and the intermediate wall lower end 19. The first floor 20 is arranged in a parallel spaced relationship below a second floor 21 that extends between the intermediate wall lower end 19 and the rear wall lower end 14. A first side wall 22 is coplanar with a second side wall 23, with the first side wall 22 extending between the rear wall 12 and the intermediate wall 17 at first ends of the rear and intermediate walls. The second side wall 23 extends from the intermediate wall 17 to the front wall 11 at first ends of the intermediate and front walls. Third and fourth side walls 24 and 25 are arranged in a coplanar relationship relative to one another and parallel relative to the first and second coplanar side walls 22 and 23, wherein a third side wall 24 extends between second end portions of the rear and intermediate walls 12 and 17, with the fourth side wall 25 extending between second ends of the intermediate and front walls 17 and 11.

To mount the container structure 10 to a shopping cart 26 having a conventional shopping cart handle tube 27, a mounting spring clip 28 is provided and secured to the rear wall 12. The mounting clip 28 includes first and second hinge tubes 29 and 30 that are coaxially aligned in a spaced relationship and fixedly mounted to the rear wall 12 in adjacency to the rear wall upper end 16. First and second semi-cylindrical clip portions 31 and 31a (see FIG. 8) are mounted to the respective first and second hinge tubes 29 and 30. A third semi-cylindrical clip portion 32 in confronting relationship relative to the first and second semi-cylindrical clip portions 31 and 31a includes third clip portion first and second tubes 33 and 34 that are coaxially aligned relative to one another and to the first and second hinge tubes 29 and 30 receiving the first and second hinge tubes 29 and 30 between the third clip portions first and second tubes 33 and 34. A coil spring member 35 oriented between the first and second hinge tubes 29 and 30 receives a clip axle 36 therethrough, as well as through the first and second hinge tubes 29 and 30 and the third clip portions first and second tubes 33 and 34, with the spring member 35 biasing the first and second semi-cylindrical clip portions 31 and 31a towards the third semi-cylindrical clip portion 32 for permitting securement about the shopping cart handle tube 27 utilizing a handle plate 37 mounted to the third clip portion 32 to permit a biased opening of the mounting spring clip 28 to receive the handle tube 27 therewithin.

First and second U-shaped supports 38 and 39 are arranged in a parallel relationship fixedly mounted to the front wall 13 extending below the front wall lower end 13 and the first floor 20. The first and second U-shaped supports 38 and 39 are arranged to receive a pencil "P" (see FIG. 2) thereon, wherein alternatively, a calculator support rack 40 (see FIGS. 6–8) is provided for mounting to the first and second U-shaped supports 38 and 39. The calculator support rack 40 includes a first leg plate 41 parallel and coplanar with a second leg plate 42 arranged for abutment to engage the first floor 20. A support rod 43 is fixedly mounted and extends orthogonally between the spaced first and second leg plates 41 and 42. A support flange 44 fixedly mounted to the first and second leg plates 41 and 42 is oriented at an obtuse included angle relative to the first and second leg plates 41 and 42, and extends forwardly of the front wall 11 extending below the first floor 20 terminating with a support flange abutment flange 45 orthogonally and integrally mounted to the support flange 44 at a spaced parallel relationship relative to the support rod 43 to position a calculator between the support rod 43 and the abutment flange 45.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A coupon holder container, comprising,
   a first container integrally mounted to and in adjacency to a second container, wherein the first container includes a first container cavity, the second container includes a second container cavity, the first container having a front wall, the second container including a rear wall, an intermediate wall parallel to the front wall and the rear wall at an interface of the first container to the second container, the front wall having a front wall lower end and the rear wall including a rear wall lower end parallel to the front wall lower end oriented above the front wall lower end, with the front wall including a front wall upper end parallel to and oriented above the front wall lower end and the rear wall lower end, with the rear wall including a rear wall upper end parallel to and above the front wall upper end, the intermediate wall including an intermediate wall upper end, and the front wall upper end in a coplanar relationship relative to the rear wall upper end, the intermediate wall including an intermediate wall lower end coplanar with the front wall lower end, a first floor directed between the front wall lower end and the intermediate wall lower end, and a second floor intersecting the intermediate wall extending between the intermediate wall lower end and the rear wall lower end, a first side wall extending from the rear wall to the intermediate wall, a second side wall coplanar with the first side wall extending from the intermediate wall to the front wall, and a third side wall extending from the rear wall to the intermediate wall in a parallel spaced relationship relative to the first side wall and the second side wall, with a fourth wall coplanar with a third side wall extending from the intermediate wall to the front wall, a spring clip member is mounted to the rear wall in adjacency to the rear wall upper end, with the spring clip having a first hinge tube and a second hinge tube that are coaxially aligned and in a spaced relationship relative to one another in adjacency to the rear wall upper end, and first and second semi-cylindrical clip portions mounted to the respective first and second hinge tubes extending below the rear wall upper end, and a third semi-cylindrical clip portion in confronting relationship relative to the first semi-cylindrical clip portion and the second semi-cylindrical clip portion, with the third semi-cylindrical clip portion having a third clip portion first tube and a third clip portion second tube that are coaxially aligned in a spaced relationship, with the first hinge tube and the second hinge tube coaxially aligned with the third clip portion first tube and the third clip portion second tube and positioned between the third clip portion first tube and the third clip portion second tube, and a clip axle directed through the first hinge tube, the second hinge tube, the third clip portion first tube, and the third clip portion second tube, and a spring member wound about the clip axle intermediate the first hinge tube and the second hinge tube in biased communication with the third semi-cylindrical clip portion to bias the third semi-cylindrical clip portion to the first semi-cylindrical clip portion and the second semi-cylindrical clip portion, and a handle plate fixedly mounted to the third semi-cylindrical clip portion for manual manipulation of the third semi-cylindrical clip portion.

2. A container as set forth in claim 1 including a first U-shaped support and a second U-shaped support each mounted fixedly to the front wall extending below the first floor, with the first U-shaped support and second U-shaped support arranged in a parallel spaced relationship.

3. A container as set forth in claim 2 including a calculator support rack having a first leg plate and a second leg plate arranged in a parallel coplanar relationship relative to one another arranged for abutment with the first floor, with a support rod fixedly and orthogonally mounted between the first leg plate and the second leg plate spaced from the front wall, with a support flange fixedly mounted to the first leg plate and the second leg plate and the support rod, with the support rod arranged for reception within the first U-shaped support and the second U-shaped support, and the support flange extending beyond the front wall and below the first floor oriented at an obtuse angle relative to the first leg plate and the second leg plate, and an abutment flange fixedly and orthogonally mounted to the support flange in a spaced parallel relationship relative to the support rod.

* * * * *